United States Patent
Moran et al.

(12) 
(10) Patent No.: US 12,190,488 B2
(45) Date of Patent: Jan. 7, 2025

(54) IMAGE PROCESSOR

(71) Applicant: Huawei Technologies Co., Ltd., Shenzhen (CN)

(72) Inventors: Sean Moran, Munich (DE); Gregory Slabaugh, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 558 days.

(21) Appl. No.: 17/480,308

(22) Filed: Sep. 21, 2021

(65) Prior Publication Data

US 2022/0036523 A1    Feb. 3, 2022

Related U.S. Application Data (63) Continuation of application No. PCT/EP2019/057137, filed on Mar. 21, 2019.

(51) Int. Cl.
| | |
|---|---|
| *G06T 5/92* | (2024.01) |
| *G06N 20/00* | (2019.01) |
| *G06T 5/10* | (2006.01) |
| *G06T 5/20* | (2006.01) |
| *G06T 5/70* | (2024.01) |

(52) U.S. Cl.
CPC ............. *G06T 5/92* (2024.01); *G06N 20/00* (2019.01); *G06T 5/10* (2013.01); *G06T 5/20* (2013.01); *G06T 5/70* (2024.01)

(58) Field of Classification Search
CPC .... G06T 5/92; G06T 5/10; G06T 5/20; G06T 5/70; G06T 5/60; G06T 1/20; G06T 2207/20084; G06N 20/00; H04N 1/60

USPC ......................................................... 382/274
See application file for complete search history.

(56) References Cited

U.S. PATENT DOCUMENTS

| | | | |
|---|---|---|---|
| 4,941,122 A | 7/1990 | Weideman | |
| 5,200,816 A * | 4/1993 | Rose | H04N 1/6019 358/518 |
| 5,446,543 A * | 8/1995 | Nakagawa | G01J 3/462 358/518 |
| 5,774,230 A | 6/1998 | Goto | |
| 6,826,310 B2 | 11/2004 | Trifonov et al. | |

(Continued)

FOREIGN PATENT DOCUMENTS

EP        0891077 A2      1/1999

OTHER PUBLICATIONS

Schwartz et al., "DeepISP: Towards Learning an End-to-End Image Processing Pipeline," pp. 1-12 (Feb. 3, 2019).

(Continued)

*Primary Examiner* — Jerome Grant, II
(74) *Attorney, Agent, or Firm* — Leydig, Voit & Mayer, Ltd.

(57) ABSTRACT

An image processing module configured to implement a multi-part trained artificial intelligence model, wherein the image processing module is configured to: receive an input image; implement a first part of the model to determine a first transformation for the image in a first colour space; apply the first transformation to the image to form a first adjusted image; implement a second part of the model to determine a second transformation for the image in a second colour space; apply the second transformation to the first adjusted image to form a second adjusted image; and output an image derived from the second adjusted image.

16 Claims, 10 Drawing Sheets

(56) References Cited

U.S. PATENT DOCUMENTS

| | | |
|---|---|---|
| 7,082,218 B2 | 7/2006 | Pollard et al. |
| 2002/0150291 A1 | 10/2002 | Naf et al. |
| 2008/0088857 A1 | 4/2008 | Zimmer et al. |
| 2015/0215590 A1 | 7/2015 | Nowozin et al. |

OTHER PUBLICATIONS

Ronneberger et al., "U-Net: Convolutional Networks for Biomedical Image Segmentation," MICCAI, pp. 1-8 (May 18, 2015).

Chen et al., "Learning to See in the Dark," Total 10 pages (May 4, 2018).

Marnerides et al., "ExpandNet: A Deep Convolutional Neural Network for High Dynamic Range Expansion from Low Dynamic Range Content," Eurographics 2018 / D. Gutierrez and A. Sheffer (Guest Editors), vol. 37 (2018), No. 2, Total 13 pages, (Sep. 4, 2019).

Jiang et al., "Learning the image processing pipeline," pp. 1-10 (May 30, 2016).

Hu et al., "Exposure: A White-Box Photo Post-Processing Framework," ACM Transactions on Graphics, pp. 1-23 (Feb. 6, 2018).

Gharbi et al., "Deep Bilateral Learning for Real-Time Image Enhancement," ACM Transactions on Graphics, vol. 36, No. 4, Article 118, Total 12 pages (Jul. 2017).

Jiang et al., "Learning the Image Processing Pipeline," Learning the IEEE Transactions on Image Processing, vol. 26, No. 10, Total 11 pages, Institute of Electrical and Electronics Engineers, New York, New York (Oct. 2017).

Gharbi et al., "Deep Joint Demosaicking and Denoising," ACM Transactions on Graphics, vol. 35, No. 6, Article 191, Total 12 pages (Nov. 2016).

\* cited by examiner

IMAGE PROCESSOR

CROSS-REFERENCE TO RELATED APPLICATIONS

This application is a continuation of International Application No. PCT/EP2019/057137, filed on Mar. 21, 2019, the disclosure of which is hereby incorporated by reference in its entirety.

FIELD

This disclosure relates to image formation in digital photography, in particular, to using trained artificial intelligence models to perform the stages of an Image Signal Processor (ISP) pipeline.

BACKGROUND

In digital photography, the problem of transforming raw camera sensor data to a visually pleasing, high-quality digital image is handled by a collection of image processing algorithms based on image signal processing techniques and known collectively as the Image Signal Processor (ISP).

Figure 1:
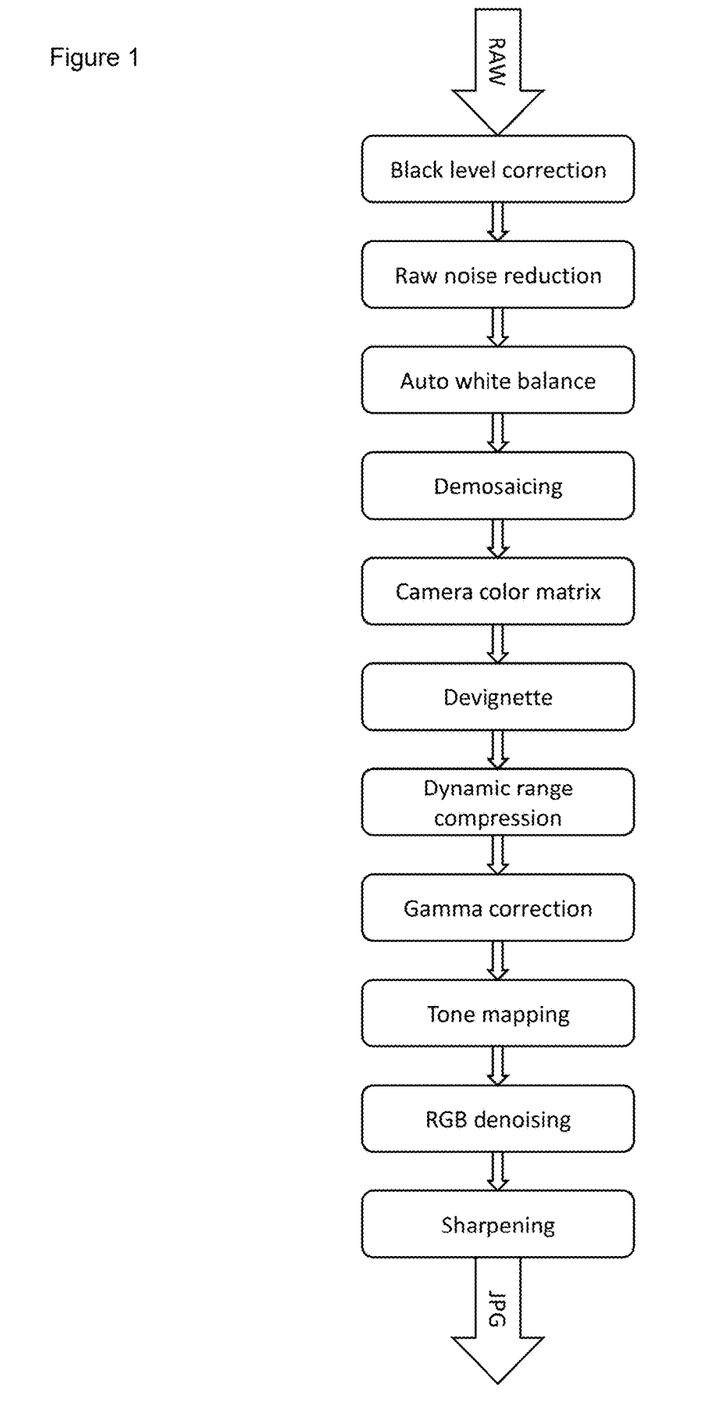
FIG. 1 shows an ISP composed of a large set of operations implemented using signal processing methods.

Traditionally, an ISP is implemented using signal processing methods. Existing ISPs consist of a large number of modules, for example, twenty, arranged typically in a sequential pipeline, with each module being responsible for a well-defined image processing operation, for example denoising, demosaicing and color correction. An example of an ISP pipeline is illustrated in FIG. 1. The output of one module feeds into the next module along in the pipeline.

Typically, an ISP has a large number of exposed parameters that require tuning for a new sensor. Therefore, conventional methods are limited by image quality and the difficulty of tuning the ISP to produce high quality results.

At the same time, it is typically very difficult to engineer a traditional ISP pipeline due to the complex dependencies between the modules in the pipeline. For example, a change to the denoising module may cause undesired artifacts to be produced by the color correction module.

Advances in deep learning have resulted in new state-of-the-art approaches to many image processing methods that are part of a traditional ISP, such as demosaicing and denoising. The use of deep neural networks has been found to produce more visually pleasing results than those based on traditional signal processing algorithms. A machine learning approach may simplify optimization by instead relying on large datasets. Some ISPs using artificial intelligence have been proposed.

DeepISP, as described in E. Schwartz, R. Giryes, A. Bronstein, "DeepISP: Learning End-to-End Image Processing Pipeline," ArXiv 2018, is a single-network deep learning approach that takes raw data and uses a simple bilinear interpolation method as input to a low-level network that performs denoising and demosaicing. Then, a high-level network learns the dynamic range correction and tone mapping. This approach replaces the ISP pipeline with a single end-to-end trainable deep neural network. This model requires a collection of images that represent the desired mapping from sensor raw data to output digital image. DeepISP has been shown to produce high-quality output images that were judged to be more aesthetically pleasing than a hardware-based ISP based on human visual inspection. However, this method does not ensure that there is consistency between different scales of the image when performing local pixel adjustments. Furthermore, the method does not allow for properties of the image to be adjusted independently of other properties.

The present inventors have discovered that it is desirable to develop an improved ISP based on deep learning components that ensures consistency between different scales of the image when performing local pixel adjustments and allows for independent adjustment of global image properties to give a high-quality image.

SUMMARY

According to a first aspect of the present disclosure, there is provided an image processing module configured to implement a multi-part trained artificial intelligence model, wherein the image processing module is configured to: receive an input image; implement a first part of the model to determine a first transformation for the image in a first color space; apply the first transformation to the image to form a first adjusted image; implement a second part of the model to determine a second transformation for the image in a second color space; apply the second transformation to the first adjusted image to form a second adjusted image; and output an image derived from the second adjusted image. The operation of the module may result in improved image quality by allowing for independent adjustment of properties in different color spaces of the image.

The module may be further configured to: receive the second adjusted image; implement a third part of the model to determine a third transformation for the image in a third color space; apply the third transformation to the image to form a third adjusted image; and output an image derived from the third adjusted image. Each of the first, second and third color spaces may be a color space in the following group: red, green, blue (RGB) space, hue, saturation, value (HSV) space and Lab space. Adjustment in all three spaces (RGB, Lab and HSV) has been found to be particularly beneficial for achieving high image quality.

At least one of the first, second and/or third transformations may be piecewise linear scaling curves. In contrast to typical deep learning-based models, the curve layer provides a human-interpretable insight into how the network is performing the mapping given that the curves can easily be read and understood by a human. In other implementations, one or more of the transformations may be represented as a surface, or the parameters of an equation.

Each of the first, second and third scaling curves may comprise knot points which are determined by the first and second parts of the model respectively. Increasing the number of knot points leads to an increase in the modelling flexibility of the curve, allowing complex relationships between input and output to be modelled.

The module may be configured to apply the respective transformations to their respective images so as to adjust a property of the respective image in the respective color space. This allows for independent adjustment of image properties.

The first and second transformations may relate the property of the image in the respective color space to scaling factors represented as a scaling curve. The scaling curve can be applied to the image in a color space to adjust a property of the image.

The property of the image may be color, luminance, saturation or hue. The adjustment of these properties may result in a more visually pleasing image.

The module may be configured to adjust the property of the respective image at the global scale of the image.

According to a second aspect of the present disclosure, there is provided a processing system comprising an image processing module as described above and a second module configured to implement an artificial intelligence model, the image processing module described above being configured to receive a combined feature map formed by the second module and to treat a portion of that feature map as the input image, the second module being configured to: receive an input feature map for a raw image, the input feature map comprising, for each of a plurality of locations in the image, data on a plurality of channels; extract features from the input feature map at a scale below the global scale of the input feature map to form a mid-level feature map; extract features from the input feature map at the global scale of the input feature map to form a global feature map; and combine the mid-level feature map and the global feature map with the input feature map to form a combined feature map. This approach may help to ensure consistency between different scales of the image when performing local pixel adjustments.

The second module may be configured to extract features from the input feature map to form the mid-level feature map and the global feature map using respective convolutional neural networks. The use of deep neural networks in image processing has been found to produce more visually pleasing results than those based on traditional signal processing algorithms. A machine learning approach may simplify optimization by instead relying on large datasets.

The second module may be further configured to extract features from the input feature map at the global scale of the input feature map using max pooling. The second module may be further configured to fuse the combined feature map by a 1×1 convolution.

The system may be configured to perform one or more of demosaicing, denoising, local luminance correction, local color correction, global luminance correction or global color correction of the raw image. Replacing the pipeline-based ISP approach with a single neural network that learns the mapping directly from data and is capable of joint optimization of demosiaicing, denoising and color correction in a single neural network architecture and permits synergies between these operations to be captured and exploited.

According to a third aspect of the present disclosure, there is provided a method for transforming a raw image captured by a camera in an image processor, the processor being configured to implement a multi-part artificial intelligence model, the method comprising: receiving an input image; implementing a first part of the model to determine a first scaling curve for the image in a first color space; applying the first scaling curve to the image to form a first adjusted image; implementing a second part of the model to determine a second scaling curve for the image in a second color space; applying the second scaling curve to the first adjusted image to form a second adjusted image; and outputting an image derived from the second adjusted image. This approach may result in improved image quality by allowing for independent adjustment of properties in different color spaces of the image.

BRIEF DESCRIPTION OF THE FIGURES

The present disclosure will now be described by way of examples with reference to the accompanying drawings. In the drawings:

FIGS. 11A and 11B show the results obtained using exemplary embodiments of the methods described herein.

DETAILED DESCRIPTION

The present disclosure relates to using an artificial intelligence-enabled ISP using deep learning to produce state-of-the-art image quality. The traditional ISP pipeline is replaced with a single end-to-end trainable neural network that can learn the ISP mapping from raw data to output high quality images based on a representative training dataset of input raw data and output digital image pairs. The neural network carries out the core traditional ISP image processing functionality of denoising, demosaicing and color correction. Denoising reduces the occurrence of noise in the image. The denoising stage can be limited to denoising the RAW data, or optionally as an additional stage on RGB data. Demosaicing interpolates the raw data to produce a color (RGB) image. These operations can be performed in different orders within the network. Each of these operations are optimized jointly by the neural network during the training stage.

Figure 2:
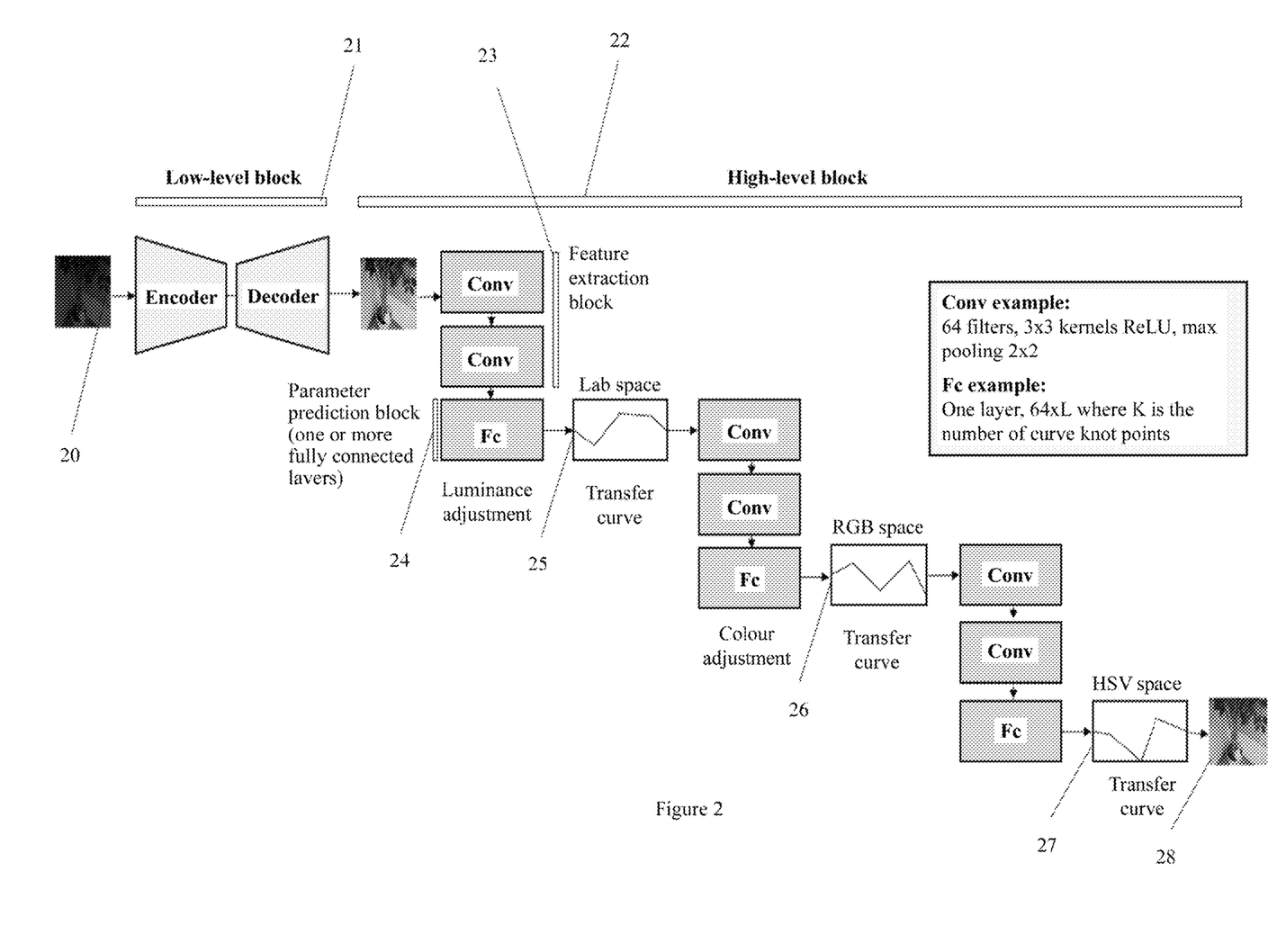
FIG. 2 shows a neural network-based architecture for image processing with low-level and high-level blocks.

FIG. 2 shows an example of the neural network architecture. A raw mosaicked image is input to the network at 20. The raw sensor input 20 is a noisy mosaic of red, green and blue color values, with one value per pixel position and adhering to a particular pattern known as a Bayer matrix. The architecture comprises two interconnected neural network blocks 21, 22. One block 21 is referred to herein as the low-level network block. The low-level block 21 performs local pixel adjustments that demosaic, denoise and correct the local luminance and color in the image. The other block 22 is referred to herein as the high-level block. The high-level block comprises a feature extraction block 23 and a parameter prediction block 24. In the example of FIG. 2, the parameter prediction block comprises a series of neural curve layers 25, 26, 27 that globally adjust image properties. The high-level block may adjust image luminance, color and saturation (based on hue). This may be additionally augmented with transformations such as saturation adjusted based on saturation, and hue adjusted based on hue, gamma correction, contrast adjustment, or exposure adjustment. The curve layer is an entirely learnable component of the image processing architecture and does not have to be specified a-priori by the user. The high-level (global) image processing block 22 therefore adjusts image-wide properties using the neural curve layers. The output 28 of the neural network is a color corrected RGB frame with a dynamic range suitable for display on standard devices (for example, devices with 256 levels per color channel).

The neural network architecture of FIG. 2 is trained end-to-end. The single end-to-end trainable neural network can learn the ISP mapping from the input data 20 to a high-quality image output 28 based on a representative training dataset of input raw data and output digital image pairs. An image pair constitutes an example for the network as to how to transform the input raw data to produce a high-quality output digital image that is ready for end-user consumption.

Figure 3A:
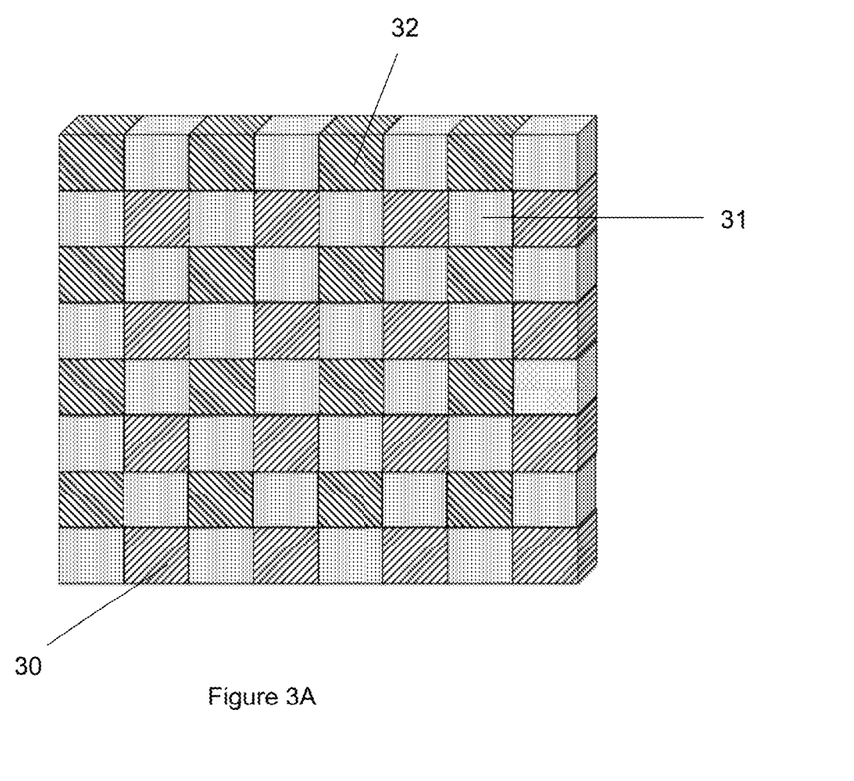
FIG. 3A shows a mosaicked image. At each pixel, either a blue, green, or red color is acquired.
Figure 3B:
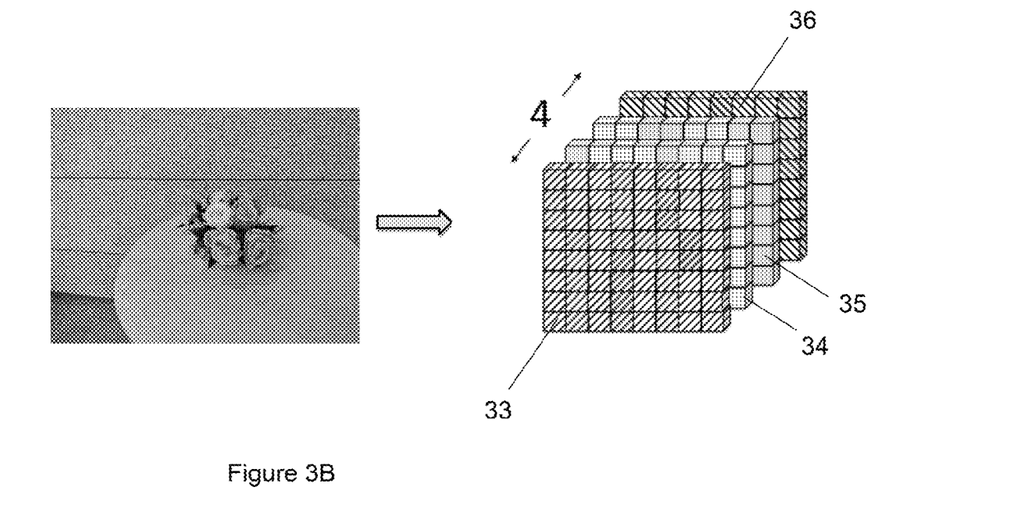
FIG. 3B shows the mosaicked image packed into four color channels representing the R, G1, G2, and B colors. In the packed form, the spatial resolution of each color channel is half the original mosaicked image resolution.

The operation of the low-level block 31 will now be described in more detail with reference to FIGS. 3 to 5.

The input to the low-level block is a raw mosaicked image (20 in FIG. 2) originating from the camera sensor. An example of a mosaicked image is shown in FIG. 3A. In a mosaicked image, each pixel has a red 30, green 31, or blue 32 value. The network demosaics this image. The goal of demosaicing is to produce an RGB image, where each pixel has a red, green and blue value. The low-level block uses convolutional neural networks (CNNs) to process the raw mosaicked image. A CNN learns a collection of filters which are applied to the image through convolution. The convolution is designed to be spatially invariant, meaning the convolution has the same effect when applied to any location in the image. A problem with applying convolutions on a mosaicked image is that the convolutions are no longer spatially invariant as a result of the color filter array (CFA). For example, when the filter is centered on a blue pixel, it may have a different effect than when centered on a red pixel. This issue is addressed by packing the data into like-color channels, each of which can then be processed in the CNN using spatially invariant convolutions. In FIG. 3B, the mosaicked image is packed into four color channels representing the R, G1, G2, and B colors, 33, 34, 35 and 36 respectively. The low-level block accepts the packed color channels as its input. The packed image is at half the resolution of the full RGB image.

In a preferred exemplary embodiment, the system is implemented as an encoder-decoder neural network architecture following the design of the performant Unet model, as described in Olaf Ronneberger, Philipp Fischer, Thomas Brox. U-Net: Convolutional Networks for Biomedical Image Segmentation. MICCAI 2015. The encoder-decoder architecture, as shown in FIG. 4, comprises a contracting (downsampling) path on the left-hand side and an expanding (upsampling) path on the right-hand side. The downsampling permits an understanding of what the image is relates to, for example, a dog in a field, whereas the upsampling branch permits an understanding of where prominent objects and details are located.

The downsampling path increases the receptive field of the model permitting a gradually larger degree of image context to be considered in the image processing operation. Each downsampling operation is technically realized by a maxpooling operator, shown by arrows of the type 40, which takes the maximum of a set of feature values in each local neighborhood. The resulting downsampled feature maps are subsequently followed by a double convolution block, shown by arrows of the type 41. As shown at 41a, this block comprises a 3×3 convolution followed by a ReLU activation, and another 3×3 convolution followed by a ReLU activation. This double convolutional block doubles the number of channels in the feature maps. The downsampling path terminates at the "bottleneck layer" 42, the lowest level of the architecture shown in FIG. 4. The bottleneck layer 42 can be considered to be a distillation of "what" the image is about, the important properties of the image such as the global color distribution, the global luminance distribution and the coarse-grained image structure.

Figure 4:
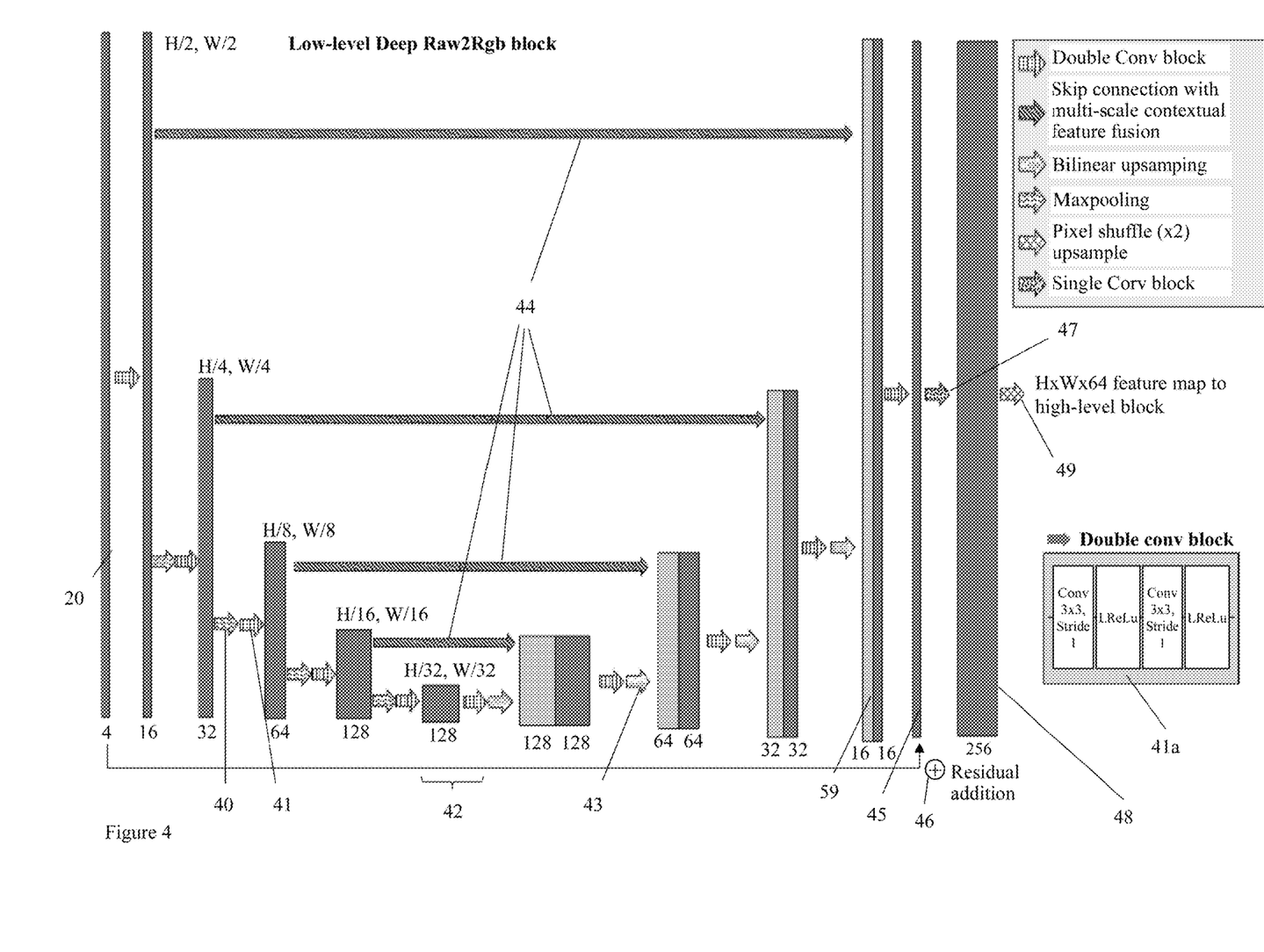
FIG. 4 shows an implementation of the low-level block of the architecture of FIG. 2.
Figure 5:
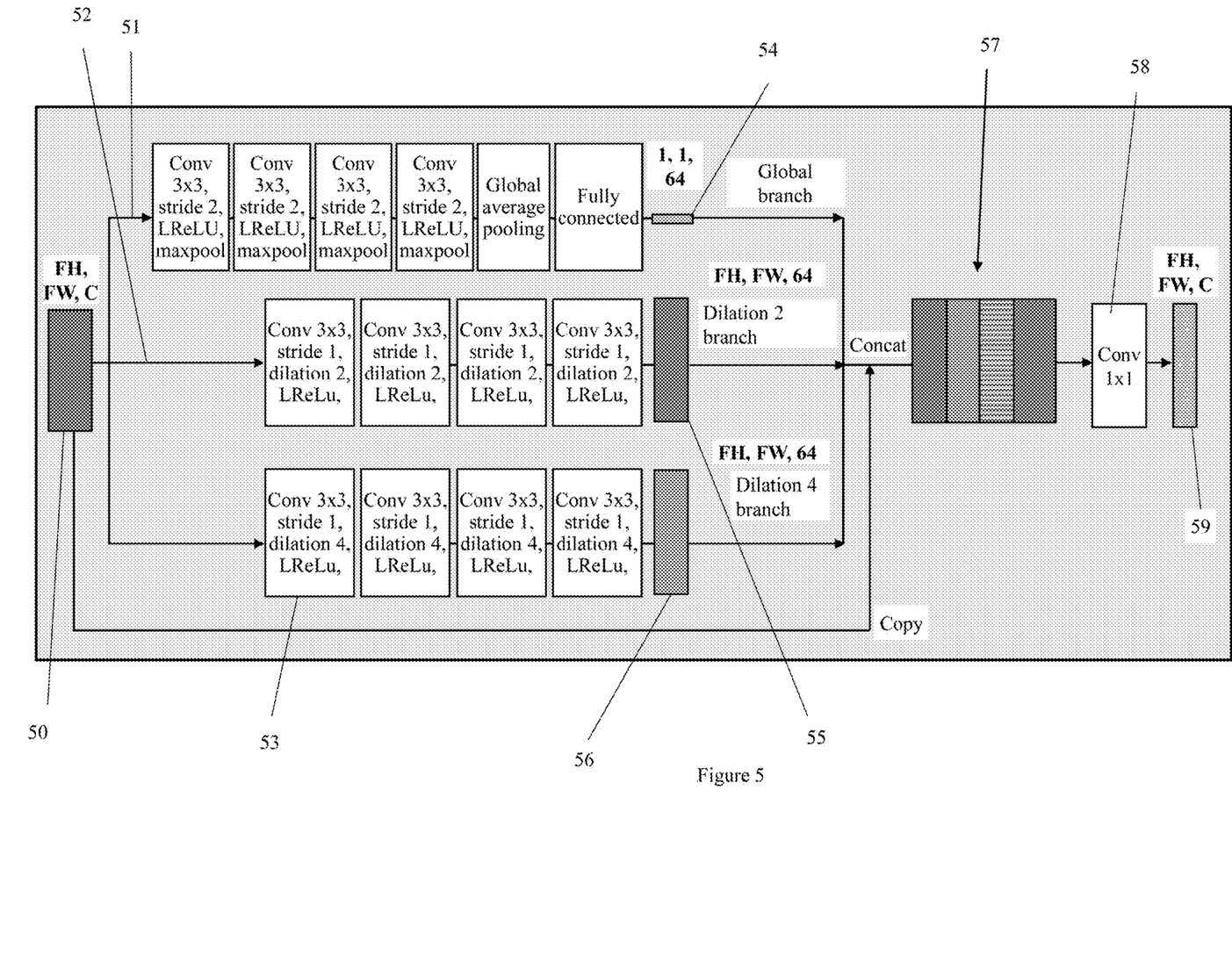
FIG. 5 shows an example of the multi-scale contextual feature fusion skip connection architecture of the low-level block of FIG. 4.

The feature maps from the bottleneck layer 42, which have the lowest spatial resolution but have the largest number of channels, are then gradually upsampled in the expanding path, as shown towards the right-hand side in FIG. 4. This upsampling path gradually increases the spatial resolution of the feature maps by a factor of two in each dimension until they are of the same width and height as the input packed image, which was one half the height and width of the full RGB image.

In one non-limiting embodiment, upsampling is performed using bilinear interpolation, shown by arrows of the type at 43, which is followed by a 1×1 convolutional layer. As the high-frequency image details will have inevitably been lost during the contracting path, the image features from the contracting path are directly passed over to the corresponding portion of the expanding path via skip connections 44. These skip connections ensure high-resolution, high-frequency image detail can be adequately recovered in the upsampling path.

To further improve the information capacity passed along the skip connections 44, in the encoder-decoder architecture of the present disclosure, the features passed along the skip connections are augmented with additional global and mid-level features that enable an enhanced preservation of global, mid-level and local image properties in the upsampling path.

This fusion of multiple different contextual image features in the encoder-decoder skip connections is denoted as a "multi-scale contextual fusion" skip connection. An example of the technical realization of the skip connections 44 is shown in FIG. 5.

An input feature map 50 having a height H and a width W, where the area of the feature map corresponds to a plurality of locations in the image, comprises data on a plurality of channels C. Along paths 52 and 53, convolutional layers with dilation rate 2 and dilation rate 4 respectively are used to realize a larger receptive field and extract mid-level contextual feature maps from the input feature map 50 to form mid-level feature maps 55 and 56 respectively. The mid-level feature maps 55, 56 are at the same spatial resolution as the input tensor 50 to the block. On path 51, global image features are extracted using a series of convolutional layers with stride 2 followed by a ReLU activation and then a max pooling operation. These layers are then followed by global average pooling and a fully connected layer.

The fully connected layer outputs a fixed dimensional feature vector 54 that is replicated across the height and width dimensions of the input. The feature maps 54, 55, 56 from the mid-level and global feature extraction networks are concatenated to the input at 57 and this combined tensor is fused by a 1×1 convolution, shown at 58, to produce a tensor 59 having a much lower number of channels than the input tensor 50.

This fusion operation merges the local, mid-level and global information in a manner that is effective for the raw to RGB conversation task. The output feature maps 59 from the multi-scale contextual fusion skip connection are concatenated to the feature maps of the upsampling path at that particular level.

As shown at 45, the output from the expanding path of the low-level block of FIG. 4 is a set of feature maps of precisely half the width and height of the full RGB image. These feature maps are added to the input packed image, shown at 46, which has been replicated along the channel dimension four times, through a long skip connection. In this manner, the low-level block effectively learns the residual adjustments to be applied to the packed input image to produce the packed output image. This residual connection aides with gradient propagation for deeper neural networks. As shown by the arrow at 47, a final convolution is applied to this feature map with 256 convolutional filters, leading to an output feature map with 256 channels, shown at 48. Finally, shown at 49, a reshape operation, also known as a pixel shuffle, rearranges elements in this tensor of shape $C \times r^2$, H, W to a tensor of shape C, H×r W×r, where r is 2 in this case. The output of the low-level block is a tensor of shape W×H×64, where 64 is the number of feature maps/channels, and this tensor acts as the input to the high-level block.

To ease training time and reduce the number of network parameters, each skip connection preferably shares the same multi-scale contextual fusion block parameters. However, different parameters may be used at the cost of additional training time and a larger neural network.

Figure 6:
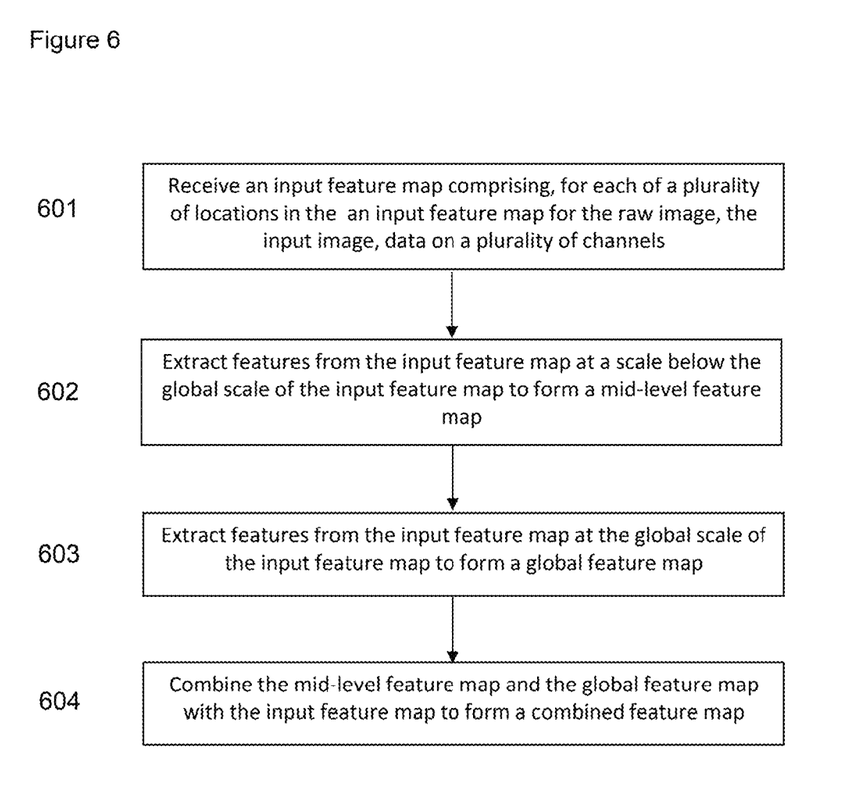
FIG. 6 shows an example of a method of operation of the low-level block.

FIG. 6 summarizes an example of the method of operation of the low-level block for transforming a raw image captured by a camera in an image processor, the processor being configured to implement a trained artificial intelligence model. At step 601, the method comprises receiving an input feature map for the raw image, the input feature map comprising, for each of a plurality of locations in the image, data on a plurality of channels. The method then moves to step 602, where features are extracted from the input feature map at a scale below the global scale of the input feature map to form a mid-level feature map. At step 603, features are extracted from the input feature map at the global scale of the input feature map to form a global feature map. At step 604, the mid-level feature map and the global feature map are combined with the input feature map to form a combined feature map.

As an example of the benefits of this skip connection, information on the global image color distribution is better maintained by this variant of skip connection, permitting an accurate reproduction of image color and luminance. The method described herein enforces consistency between the local pixel adjustments and mid-level to high-level image properties (e.g., global color distribution). This enforcement reduces the incidence of unsightly image artifacts appearing. For example, manipulating low-level pixel properties without considering global context can lead to a situation where the model can make local decisions that are not spatially consistent. For example, blue sky where the hue of the sky changes abruptly in a local pixel neighborhood. The low-level (local) pixel processing neural network block 21 therefore captures synergies between low, middle and high-level image properties when learning the local image transformation (i.e., demosaicing, denoising, local luminace and local color adjustment) using a multi-scale contextual fusion neural network layer. This architecture has been shown to be effective for image transformation tasks producing high-quality output.

Furthermore, the downsampling of the high-resolution image as performed by the model makes the low-level block amenable to processing large, mega-pixel images on a single graphics processing unit (GPU), without splitting the image into smaller patches. The need to split an image into smaller patches, and process each patch independently, plagues existing models which apply convolutions directly on full resolution images. This can lead to unsightly image artifacts, such as color inconsistencies between nearby patches. This issue is avoided in the encoder-decoder design of FIGS. 4 and 5 for the low-level block 21.

The output image from the low-level block is a color RGB image that has corrected brightness, contrast, colors and exposure.

The high-level block receives a rich feature-set from the low-level block, represented as a tensor of dimension W×H×C, where W is the input image width, H is the input image height and C is the number of channels/feature maps as produced by the low-level network. The first three channels of this tensor are treated as the image to be globally adjusted, and the remaining channels are a feature-set used to learn the transformations that perform the image adjustment.

Figure 7:
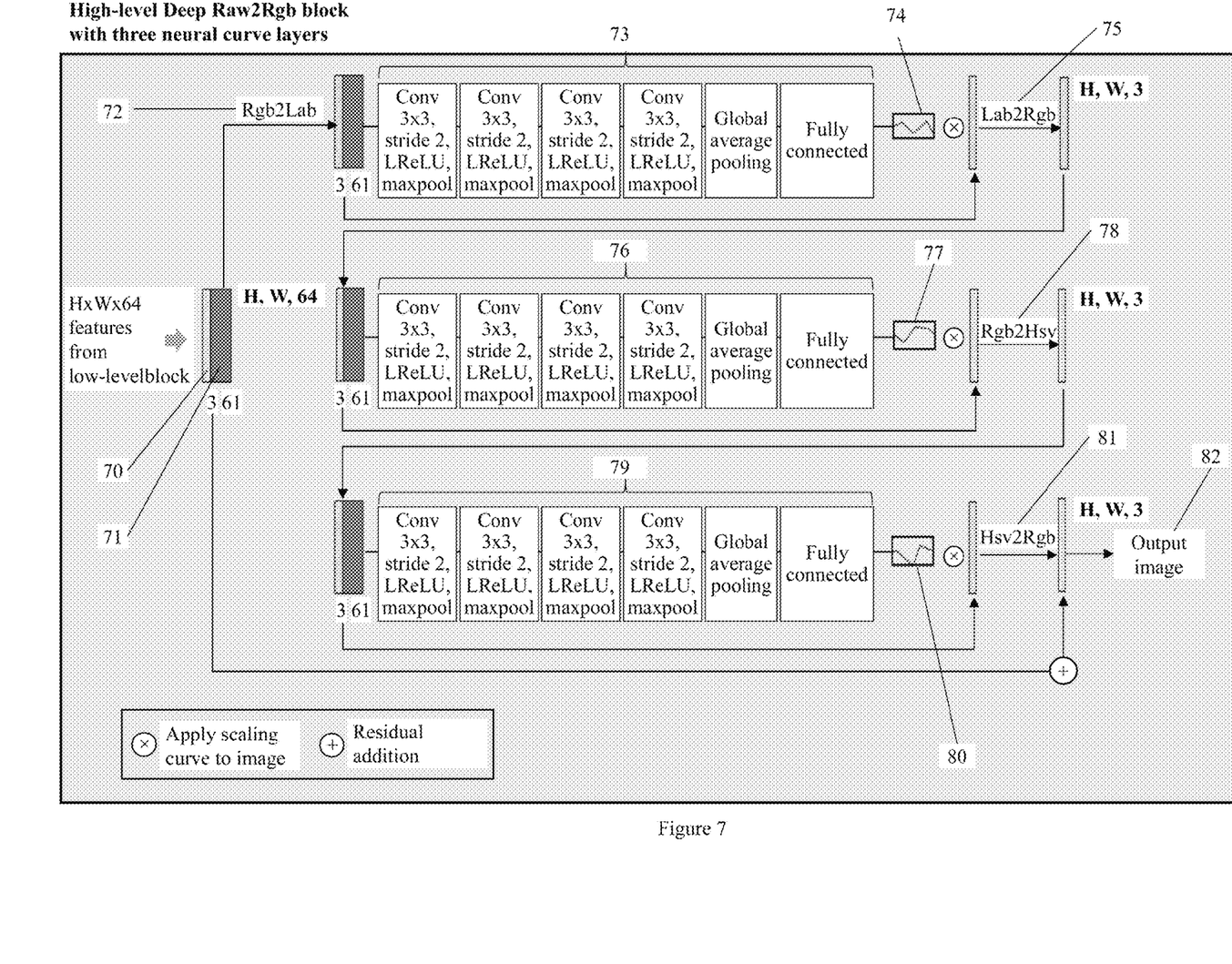
FIG. 7 shows an implementation of the high-level block of the architecture of FIG. 2.

A non-limiting embodiment of the high-level block neural network architecture is shown in FIG. 7. In this example, firstly, the input feature maps of dimension H×W×64 are split into two tensors, 70 and 71. Tensor 70 represents the image to be refined of dimension H×W×3, and tensor 71 represents the remaining feature maps of dimension H×W×61.

To enable independent adjustment of image properties such as hue, saturation, color and luminance, transformations are learnt in different, standard image processing color spaces/domains. These domains are RGB, Lab and HSV. In the example of FIG. 7, the high-level block learns three piecewise linear scaling curves to adjust, firstly luminance in Lab space, then color in RGB space, and then final saturation based on hue in HSV space. Transformation into and out of HSV, Lab and RGB color spaces is differentiable, permitting curve construction using standard deep learning optimization methods.

As shown at 72, the image is firstly converted to Lab space in a differentiable manner which permits end-to-end learning of parameters in the high-level block. Lab space is useful as it separates the luminance (L channel) from the colors (a, b channels). Manipulating pixels in this space permits precise adjustment of the image luminance without influencing the color. The Lab image is concatenated with the H×W×61 features to form a H×W×64 tensor that is input into the feature extraction block 73. The feature extraction block 73 in Lab space consists of a series of convolutional layers, ReLU and maxpooling operations, which are followed by a global average pooling and fully connected layer. The fully connected layer regresses the parameters of the L channel scaling curve, shown at 74. The scaling curve 74 scales the pixel values in the L channel to form an adjusted image. Finally, the Lab image is converted back to RGB, shown at 75, using a differentiable Lab to RGB conversion.

Next, the H×W×3 RGB image from the previous step is concatenated with the H×W×61 feature maps and fed into the second feature extraction block 76. This block regresses the knot points of the RGB scaling curve 77. This curve 77 is applied to the RGB image to adjust the colors in the image.

Next, the H×W×3 RGB image from the previous step is converted to HSV (hue, saturation, value) space, shown at 78, via a differentiable RGB to HSV transformation. HSV space separates the hue, saturation and value (akin to brightness) properties of an image, and is particularly powerful in permitting independent control of hue, saturation and value. The HSV image is concatenated with the H×W×61 feature map tensor and this is used as input to the feature extraction block 79 which regresses the know points of the saturation scaling curve 80. This curve 80 is applied to the HSV image to adjust saturation based on hue and the HSV image is converted back to RGB space via a differentiable HSV to RGB conversion, shown at 81, and the image is output at 82.

In the example of FIG. 7, the transformations learnt by the model in the high-level block are curve layers that each comprise a piecewise linear scaling curve defined by a set of "knot points" which are output for the curves 74, 77, 80. The knot points are the joins between each linear segment of the curve. In FIG. 7, the knot points for each curve are learnt by passing the W×H×C feature set through the feature extraction blocks 73, 76 and 79 respectively to a group of 3×3 convolutional layers with stride 2, with each layer followed by a maxpooling, a global average pooling and fully connected layer. The outputs of the fully connected layer of each feature extraction block 73, 76, 79 are the knot points of the curve. Increasing the number of knot points leads to an increase in the modelling flexibility of the curve, allowing complex relationships between input and output to be modelled.

Therefore, given any input image, the model learns to construct a piecewise linear scaling curve specific to that input image that globally adjusts the desired image properties, such as hue, saturation, luminance or color. One curve is learnt per image property. In each color space, the learnt piecewise linear scaling curve precisely scales image pixels up or down in magnitude in a manner that is optimized for reproducing the color, luminance and saturation of the target groundtruth image.

Figure 8:
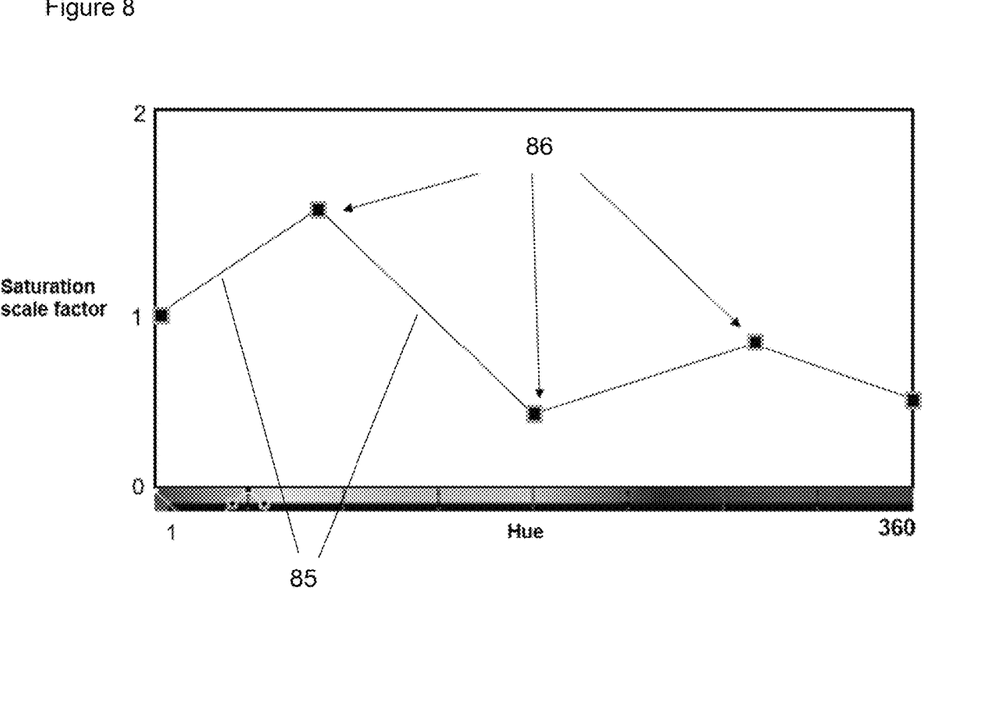
FIG. 8 shows an example of a piecewise linear scaling curve for adjusting hue based on saturation.

An example of a scaling curve for adjusting the hue of an image is shown in FIG. 8. The linear segments 85 of the scaling curve are joined by knot points, shown at 86. The convolutional layers and the fully connected layer of the high-level block predict the knot points 86 of the scaling curve. The curve adjusts the image by scaling pixels using the equation:

$$S(x) = k_0 + \sum_{i=0}^{L-1} (k_{i+1} - k_i) \text{ clip } (L.x - i, 0, 1)$$

where $k_0$ is the starting point, $k_1$ are parameters (knots) predicted by the deep network (output of FC layer), clip(.) is a function that restricts the data to a certain range, L is the number of knot points, x in the input value (e.g., luminance, hue) and S(x) is the scaling factor to apply.

Figure 9:
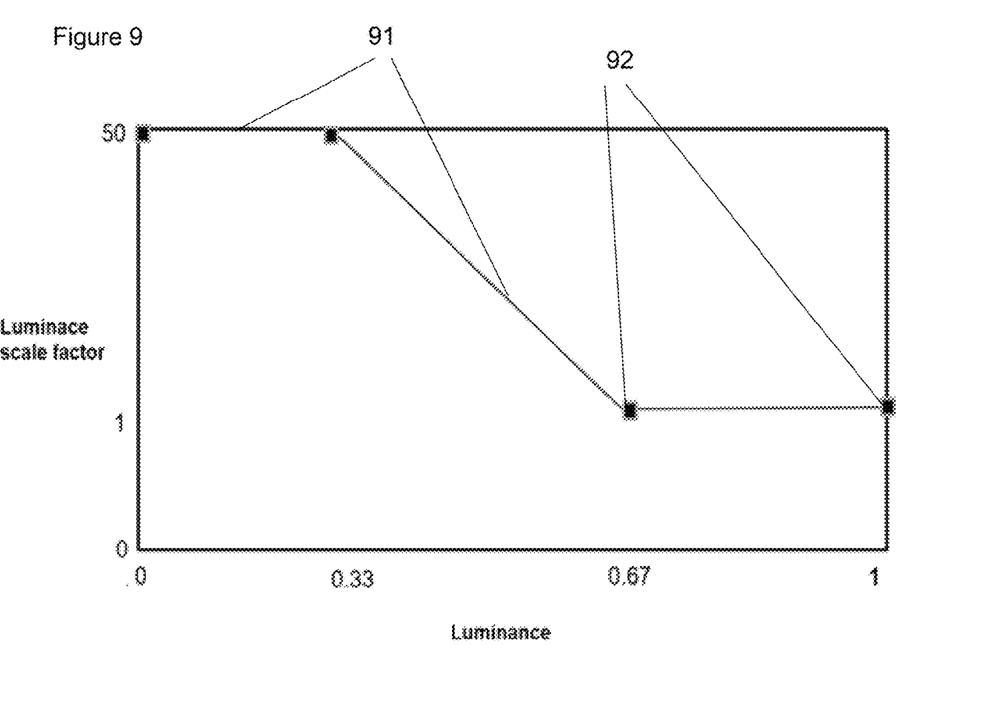
FIG. 9 shows an example of a piecewise linear scaling curve for adjusting luminance.

In another example, the high-level block could learn a scaling curve that has the effect of adjusting the global luminance of the image. Such a curve is shown in FIG. 9, with linear piecewise segments 91 and knot points 92. The x-axis of the curve is the luminance and the y-axis is the scale factor to apply to pixels to adjust the luminance. This curve boosts the low-luminance pixels by 50 times, leaving the high-luminance pixels alone. The adjustment is performed in Lab space, adjusting the L channel.

In a further example, the feature extraction block may learn a different type of transformation. For example, the image processing method may also adjust global image properties by the prediction of a surface, or by predicting the parameters of a parametric equation. Therefore, non-limiting examples of the transformation learnt by the network are scaling curves, which may be piecewise linear curves, surfaces, or the parameters of an equation. For example, an equation may be used to adjust contrast, white balance or perform gamma correction in a color space of an image.

Experiments have shown that adjustment in all three spaces (RGB, Lab and HSV) is particularly beneficial for achieving high image quality, compared to simply adjusting, for example, colors in RGB space. However, adjustments in any combination of color spaces may be performed. The application of individual color spaces may also be repeated. For example, four transformations may be learnt: one in RGB space, one in Lab space and two in HSV space. Transformations for adjusting different properties may also be learnt and performed in the same color space by different feature extraction blocks. In one example, one curve may be learnt in HSV space for saturation based on hue, and another curve may be learnt in HSV space for saturation based on saturation. The example of FIG. 7 describes the use of three scaling curves: one learnt in each of the three color spaces. However, the use of four or more curves is also possible, for example for hue mapping based on hue, or saturation mapping based on saturation.

In other embodiments, the applications of the curves could follow a different order from that shown in FIG. 7. For example, luminance may be adjusted first, then color, then saturation adjustment.

The convolutional layers of the feature extraction blocks in the steps above can either share parameters, lowering the parameter count of the model, or can be separate for each transformation. This is a form of multi-task learning (known as hard parameter sharing).

The fully connected layers, in all cases, will be separate for each transformation. Where the transformation is a scaling curve, these are responsible for regressing the knot points of each curve. In contrast to typical deep learning-based models, the curve layer provides a human-interpretable insight into how the network is learning the mapping given that the curves can easily be read and understood by a human.

Figure 10:
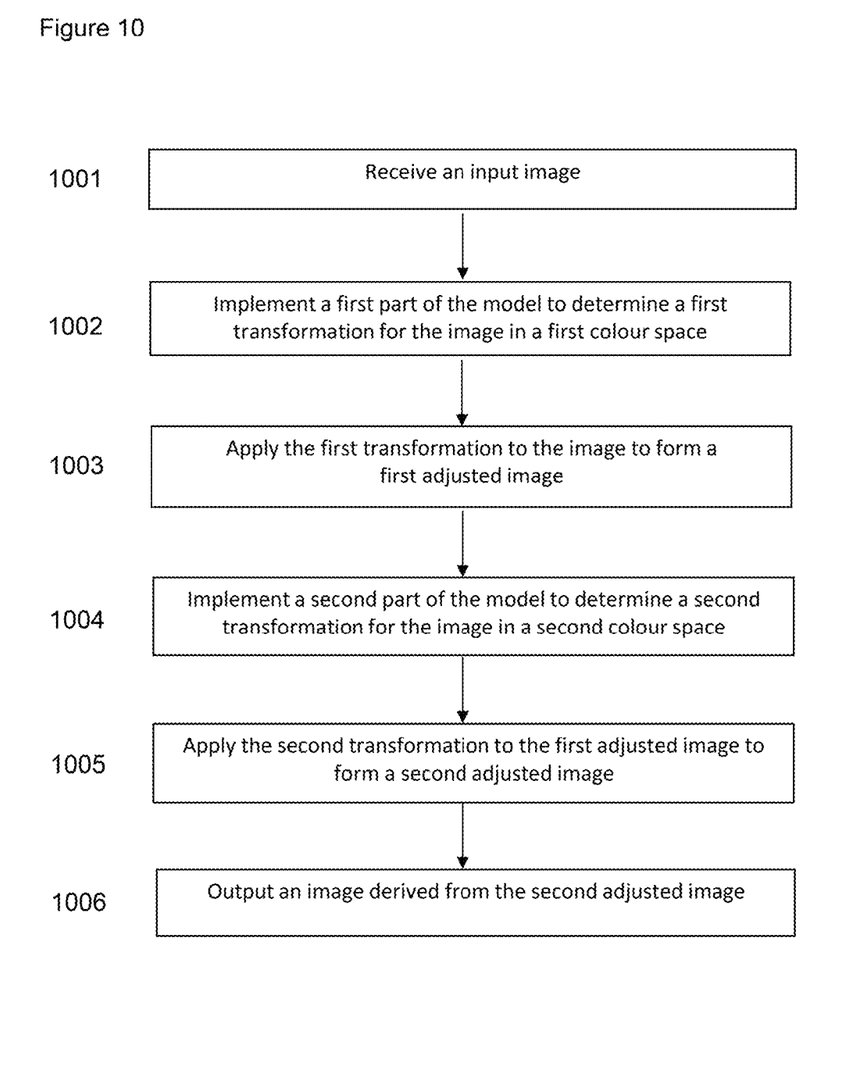
FIG. 10 shows an example of a method for transforming a raw image captured by a camera in an image processor, where the processor is configured to implement a multi-part artificial intelligence model.

FIG. 10 summarizes a method for transforming a raw image captured by a camera in an image processor, the processor being configured to implement a multi-part artificial intelligence model. In step 1001, the method comprises receiving an input image. The next step at 1002 comprises implementing a first part of the model to determine a first transformation for the image in a first color space. At step 1003, the method further comprises applying the first transformation to the image to form a first adjusted image. At step 1004, a second part of the model is implemented to determine a second transformation for the image in a second color space. At step 1005, the method further comprises applying the second transformation to the first adjusted image to form a second adjusted image. At step 1006, an image derived from the second adjusted image is output.

As described previously with reference to FIG. 2, the low-level and high-level blocks are interconnected to form the complete model, facilitating joint learning of the local and global image operations using a dataset of training pairs. The high-level block can be configured to receive the combined feature map formed by the low-level block and to treat a portion of that feature map as the input image.

During training, the model learns the convolutional filters and fully connected layers of the low-level and high-level blocks jointly in an end-to-end manner. This is done using training pairs, each consisting of a raw and a corresponding RGB image. Training pairs can be generated by capturing images with a high-quality camera, in both RAW and JPG format. Initially the convolutional filters are set to random values. The raw input is input into the network, and the network regresses an output image. The difference between the regressed output image and the RGB image forms an error, which is then back-propagated through the network from the output to the input though gradients. The weights of the network are then updated to reduce the error. The training process iterates using a large collection of images until the network weights converge.

Figure 11A:
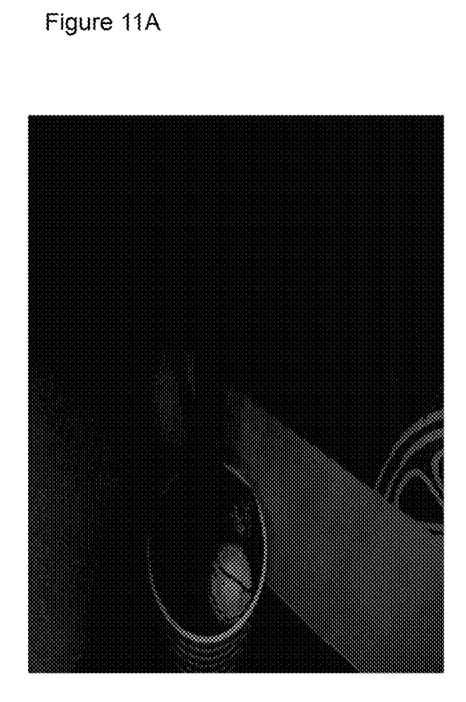
FIG. 11A shows the image input. The image is visualized with a dark color due to the high dynamic range content.
Figure 11B:
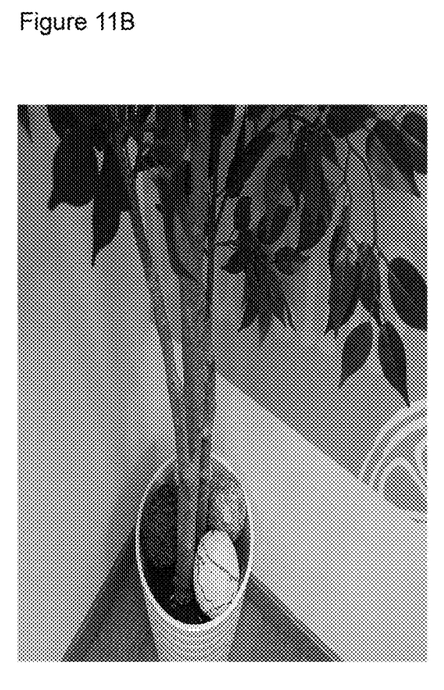
FIG. 11B shows the output image. The image brightness has been corrected and the colors and exposure are much improved.

Once the network is trained, it can be applied to raw images to produce 8-bit dynamic range images, with correct brightness, contrast, colors, and exposure. The latter is important, as bright regions are not be overexposed, and dark regions are not be underexposed. FIG. 11A provides an example of an input raw image. The image is visualized with a dark color due to the high dynamic range content. FIG. 11B shows the output of the method described herein. The image brightness has been corrected and the colors and the exposure are much improved. The system is therefore configured to implement an end-to-end trained artificial intelligence model based on deep learning to transform RAW data into a high-quality image.

Figure 12:
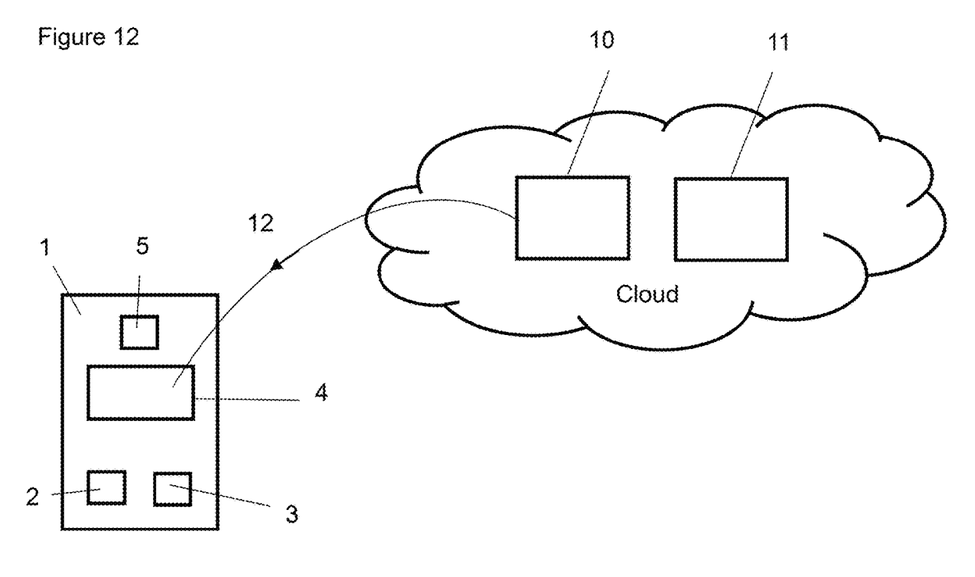
FIG. 12 shows an example of a camera configured to implement the methods described herein.

FIG. 12 shows an example of a camera configured to use the methods described herein to process images taken by an image sensor in the camera. Such a camera 1 typically includes some onboard processing capability. This could be provided by the processor 4. The processor 4 could also be used for the essential functions of the device.

The transceiver 5 is capable of communicating over a network with other entities 10, 11. Those entities may be physically remote from the camera 1. The network may be a publicly accessible network such as the internet. The entities 10, 11 may be based in the cloud. Entity 10 is a computing entity. Entity 11 is a command and control entity. These entities are logical entities. In practice, they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 5 of camera 1. The memory stores in a non-transient way code that is executable by the processor to implement the respective entity in the manner described herein.

The command and control entity 11 may train the artificial intelligence models used in the ISP. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the deep learning algorithm has been developed in the cloud, the command and control entity can automatically form a corresponding model and cause it to be transmitted to the relevant camera device. In this example, the ISP is implemented at the camera 1 by processor 4.

In another possible implementation, an image may be captured by the camera sensor 2 and the image data may be sent by the transceiver 5 to the cloud for processing. The resulting target image could then be sent back to the camera 1, as shown at 12 in FIG. 12.

Therefore, the methods may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g., using an inference engine. The methods may also be implemented at the camera, in a dedicated piece of hardware, or in the cloud.

The traditional ISP pipeline is therefore replaced with a single end-to-end trainable neural network that can learn the ISP mapping from raw data to output high quality image based on a representative training dataset of input raw data, output digital image pairs. The single neural network learns the mapping directly from data and is capable of joint optimization of demosiaicing, denoising and color correction in a single neural network architecture and permits synergies between these operations to be captured and exploited. The trained deep neural network receives the raw sensor data as its input and maps that data to a visually pleasing output digital image for end-user consumption and has in some implementations been shown to result in significant improvements in output image quality.

Replacing the traditional ISP pipeline with a deep neural network brings about the following further technical advantages.

The present disclosure involves one stage of processing compared to a multitude, for example twenty stages, for the traditional ISP.

The low-level block is designed to more effectively capture low, medium and global image statistics and to ensure there is cross-talk and therefore consistency between these image scales when performing the local pixel adjustments. Due to use of down-sampling operations, it is also more amenable to processing full mega-pixel images on a single GPU without the requirement of breaking up the image into smaller patches (patch-based inference is avoided).

The high-level block proposes a neural curve layer that globally adjusts key image properties such as saturation, luminance and color in a human-interpretable manner. The neural curve layer maps input pixel values to output pixel values using a piecewise linear scaling curve that is learnt for each individual image. A human can visually inspect the learnt curve for a particular image to precisely understand how the network has adjusted the image property.

Using a piecewise linear curve offers additional modelling flexibility. Deep ISP models the RGB pixel transformation using a polynomial surface, which is more limited in flexibility compared to a piecewise linear curve with sufficient knot points. Furthermore, in comparison to other works (e.g., Exposure, HDRNet), the piecewise linear curve is not constrained to be monotonic and is able to model quantities that naturally wrap-around in value, such as hue.

The curve can also be learnt in three different image processing color spaces (Lab, RGB, HSV), not just one, reaping the benefits that these color spaces offer in allowing properties of images to be adjusted independently of other properties, for example changing the luminance independently of the color.

The present disclosure also achieves better handling of variation. Digital photographs have a large amount of variation, for example, they can be taken under varying conditions such as indoor/outdoor, daytime/night-time, zoomed in/out, etc. and the content in the photo can vary hugely. It is difficult for traditional algorithms to work consistently across these sources of variation. However, by learning from rich examples, deep learning methods can produce high quality results adaptively based on image content.

Deep learning with neural networks has been shown to outperform traditional methods in most image enhancement tasks. The model is able to handle complex image transformations better than existing prior art. Furthermore, there are limited, and, in some cases, no parameters to tune. Deep learning models have a large number of parameters, however, these parameters are learned automatically during training. Components in a traditional ISP expose parameters that must be tuned, either manually or algorithmically. Parameters adjusted in the early stages of an ISP affect all the later stages, making the tuning of a traditional ISP a complicated exercise.

There are also advantages in term of the hardware required to implement the application. Traditional ISPs are implemented on dedicated application-specific integrated circuits (ASICs). These are expensive to develop and require dedicated chips to be included with the device. The AISP can be implemented on generic neural processing units (NPUs), saving the expense and complication of developing custom ISP chips for inclusion on the device.

The method described herein improves upon known methods by offering a very different neural network architecture for the end-to-end ISP task, with advantages in terms of image quality and computational memory requirements.

The approach is applicable to both still photography and video.

Each individual feature described herein and any combination of two or more such features are capable of being carried out based on the present specification as a whole in light of the common general knowledge of a person skilled in the art, irrespective of whether such features or combinations of features solve any problems disclosed herein, and without limitation to the scope of the claims. The aspects of the present application may consist of any such individual feature or combination of features. In view of the foregoing description, various modifications may be made within the scope of the application.

What is claimed is:

1. An image processor configured to implement a multi-part trained artificial intelligence model, the image processor being configured to:
   receive an input image;
   implement a first part of the artificial intelligence model to determine a first transformation for the input image in a first color space, the first part of the artificial intelligence model comprising a first neural network;
   apply the first transformation to the input image to form a first adjusted image;
   implement a second part of the artificial intelligence model to determine a second transformation for the input image in a second color space, the second part of the artificial intelligence model comprising a second neural network different from the first neural network, the second color space being different from the first color space;
   apply the second transformation to the first adjusted image to form a second adjusted image; and
   output an image derived from the second adjusted image.

2. The image processor of claim 1, wherein the image processor is further configured to:
   receive the second adjusted image;
   implement a third part of the artificial intelligence model to determine a third transformation for the input image in a third color space, the third part of the artificial intelligence model comprising a third neural network different from the first neural network and the second neural network, the third color space being different from the first color space and the second color space;
   apply the third transformation to the input image to form a third adjusted image; and
   output an image derived from the third adjusted image.

3. The image processor of claim 2, wherein each of the first color space, the second color space, and the third color space is a color space from the following group: red, green, blue (RGB) space, hue, saturation, value (HSV) space, or Lab space.

4. The image processor of claim 1, wherein each of the first and the second transformations is a piecewise linear scaling curve.

5. The image processor of claim 4, wherein each of the first and the second transformations comprises knot points which are determined by the first part and the second part of the artificial intelligence model, respectively.

6. The image processor of claim 1, wherein the image processor is configured to respectively apply the first transformation and the second transformation to the input image and the first adjusted image so as to respectively adjust a corresponding property of the input image and the first adjusted image in the respective one of the first color space or the second color space.

7. The image processor of claim 6, wherein the first transformation and the second transformation respectively relate the corresponding property in the respective one of the first color space or the second color space to a scaling factor.

8. The image processor of claim 6, wherein the property of the input image is color, luminance, saturation, or hue.

9. The image processor of claim 6, wherein the image processor is configured to respectively adjust the corresponding property of the input image and the first adjusted image at a global scale of the input image.

10. An image processing system comprising the image processor according to claim 1 and a second device configured to implement a second artificial intelligence model, the image processor according to claim 1 being configured to receive a combined feature map formed by the second device and to treat a portion of the combined feature map as the input image, the second device being configured to:
    receive an input feature map for a raw image, the input feature map comprising, for each of a plurality of locations in the raw image, data on a plurality of channels;
    extract features from the input feature map at a scale below a global scale of the input feature map to form a mid-level feature map;
    extract features from the input feature map at the global scale of the input feature map to form a global feature map; and
    combine the mid-level feature map and the global feature map with the input feature map to form a combined feature map.

11. The image processing system of claim 10, wherein the second device is configured to extract features from the input feature map to form the mid-level feature map and the global feature map using respective convolutional neural networks.

12. The image processing system of claim 10, wherein the second device is further configured to extract features from the input feature map at the global scale of the input feature map using max pooling.

13. The image processing system of claim 10, wherein the second device is further configured to fuse the combined feature map by a 1×1 convolution.

14. The image processing system of claim 10, wherein the image processing system is configured to perform one or more of demosaicing, denoising, local luminance correction, local color correction, global luminance correction or global color correction of the raw image.

15. A method for transforming a raw image captured by a camera in an image processor, the image processor being configured to implement a multi-part artificial intelligence model, the method comprising:
    receiving an input image;
    implementing a first part of the artificial intelligence model to determine a first scaling curve for the input image in a first color space, the first part of the artificial intelligence model comprising a first neural network;
    applying the first scaling curve to the input image to form a first adjusted image;
    implementing a second part of the artificial intelligence model to determine a second scaling curve for the input image in a second color space, the second part of the artificial intelligence model comprising a second neural network different from the first neural network, the second color space being different from the first color space;
    applying the second scaling curve to the first adjusted image to form a second adjusted image; and
    outputting an image derived from the second adjusted image.

16. An image processor configured to implement a multi-part trained artificial intelligence model, the image processor being configured to:
    receive an input image;
    implement a first part of the model to determine a first transformation for the input image in a first color space;
    apply the first transformation to the input image to form a first adjusted image;
    implement a second part of the model to determine a second transformation for the input image in a second color space;
    apply the second transformation to the first adjusted image to form a second adjusted image; and
    output an image derived from the second adjusted image,
    wherein each of the first and the second transformations is a piecewise linear scaling curve, and
    wherein each of the first and the second transformations comprises knot points which are determined by the first and the second parts of the model, respectively.

* * * * *